United States Patent [19]

McGuire et al.

[11] Patent Number: 5,351,538
[45] Date of Patent: Oct. 4, 1994

[54] ON-LINE FISHING DEPTH INDICATOR

[75] Inventors: Michael P. McGuire, Ripon, Wis.; John J. Dill, II, Kalamazoo; Michael J. Barker, Portage, both of Mich.

[73] Assignee: Bait Data, Inc., Ripon, Wis.

[21] Appl. No.: 137,394

[22] Filed: Oct. 14, 1993

Related U.S. Application Data

[63] Continuation of Ser. No. 845,913, Mar. 4, 1992, abandoned.

[51] Int. Cl.⁵ .............................. G01F 23/14
[52] U.S. Cl. ............................ 73/301; 43/4
[58] Field of Search ........... 73/299, 300, 301; 367/118, 130, 131, 141, 908, 910; 43/17, 17.1, 43.1, 4

[56] References Cited

U.S. PATENT DOCUMENTS

| | | | |
|---|---|---|---|
| 331,133 | 11/1885 | Hanney | 73/300 |
| 410,786 | 9/1889 | Cooper et al. | 73/301 |
| 1,359,763 | 11/1920 | Smith | 73/300 |
| 2,413,651 | 12/1946 | Petty | 73/300 |
| 2,637,998 | 5/1953 | Ramser | 73/301 |
| 2,674,881 | 4/1954 | Rich | 73/300 |
| 2,821,805 | 2/1958 | Kunze | 367/130 |
| 3,038,143 | 6/1962 | Dow | 367/130 |
| 3,161,053 | 12/1964 | Bell | 73/300 |
| 3,308,425 | 3/1967 | McLoad | 367/141 |
| 3,785,079 | 1/1974 | Rohn | 43/4 |
| 3,857,283 | 12/1974 | Jennings et al. | 73/300 |
| 3,874,108 | 4/1975 | Connor | 33/720 |
| 4,050,180 | 9/1977 | King | 43/4 |
| 4,104,917 | 8/1978 | Rieth et al. | |
| 4,225,952 | 9/1980 | Lewis | 367/910 |
| 4,635,242 | 1/1987 | Hart | 367/910 |
| 4,926,397 | 5/1990 | Robertson | |
| 4,943,951 | 7/1990 | Leavell et al. | 367/910 |
| 4,995,009 | 2/1991 | Altmire et al. | 367/910 |

FOREIGN PATENT DOCUMENTS 26846  7/1907  United Kingdom ................ 73/300

*Primary Examiner*—Thomas B. Will
*Assistant Examiner*—G. Bradley Bennett
*Attorney, Agent, or Firm*—Robert C. Curfiss

[57] ABSTRACT

An on-line fishing depth indicator is adapted to be placed either in series or in parallel on a typical fishing line in combination with fishing bait. The indicator is adapted to read and store the maximum depth of the bait during a trolling operation under controlled conditions. This permits the user to determine the performance of the bait under certain, predefined conditions. The electronics and pressure transducers associated with the indicator are self-contained in the unit.

40 Claims, 5 Drawing Sheets

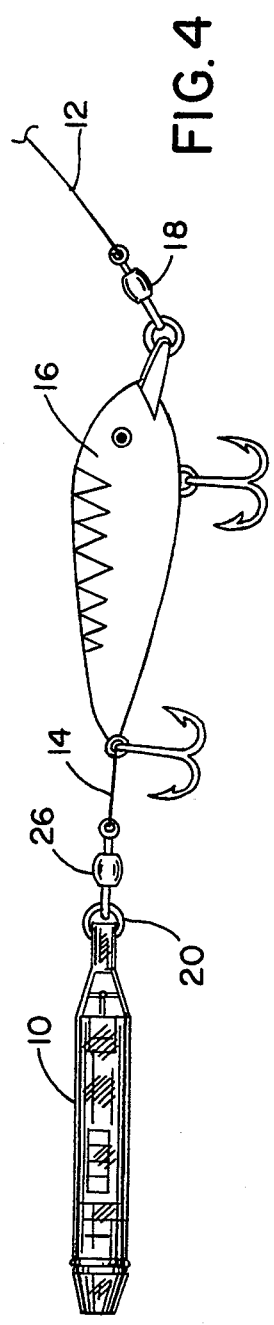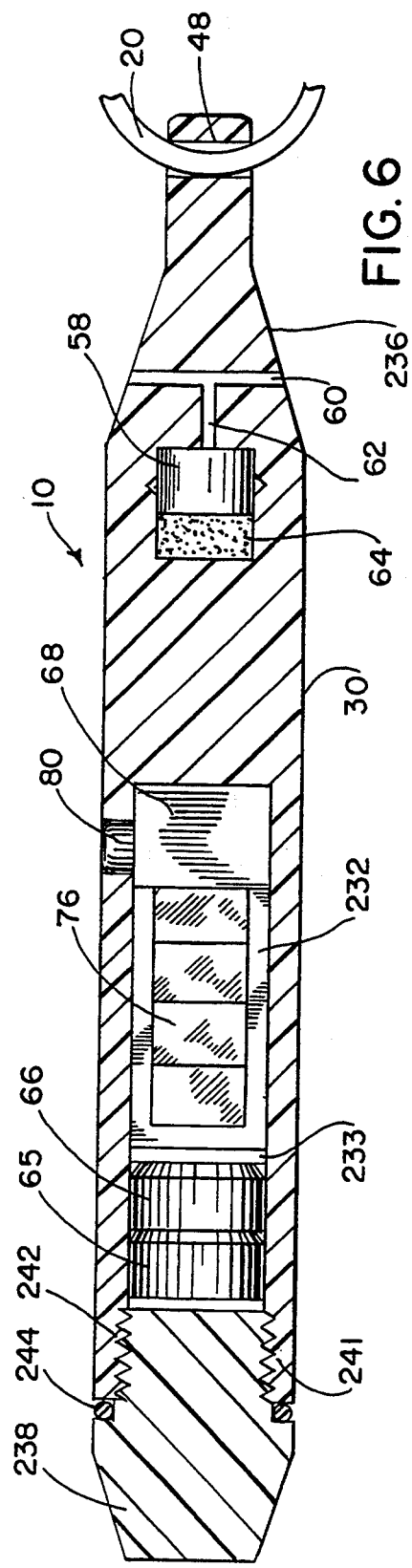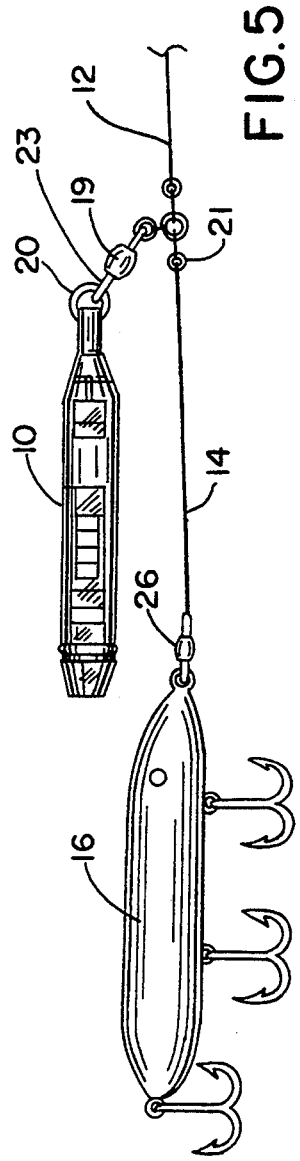

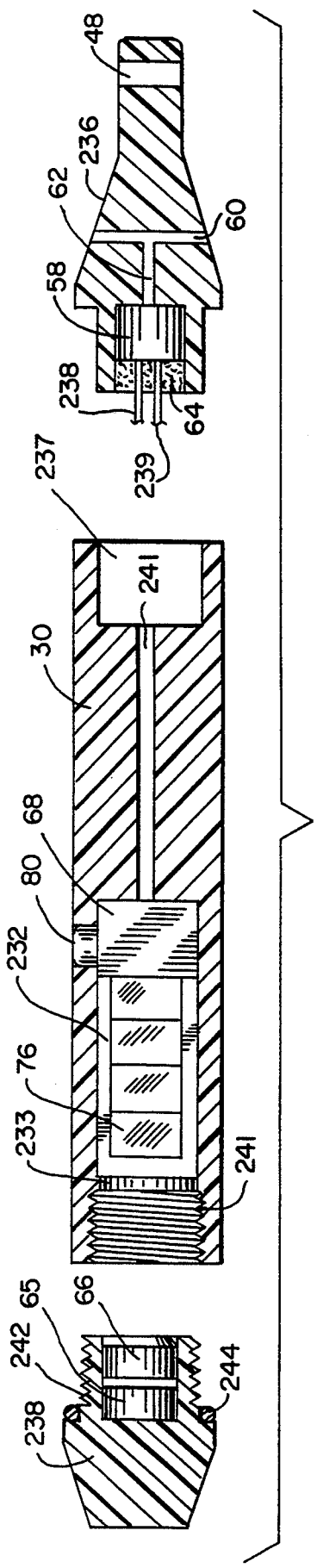
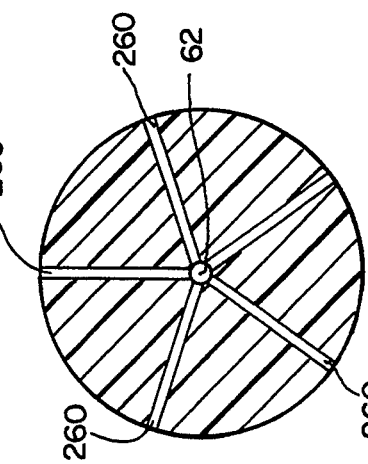
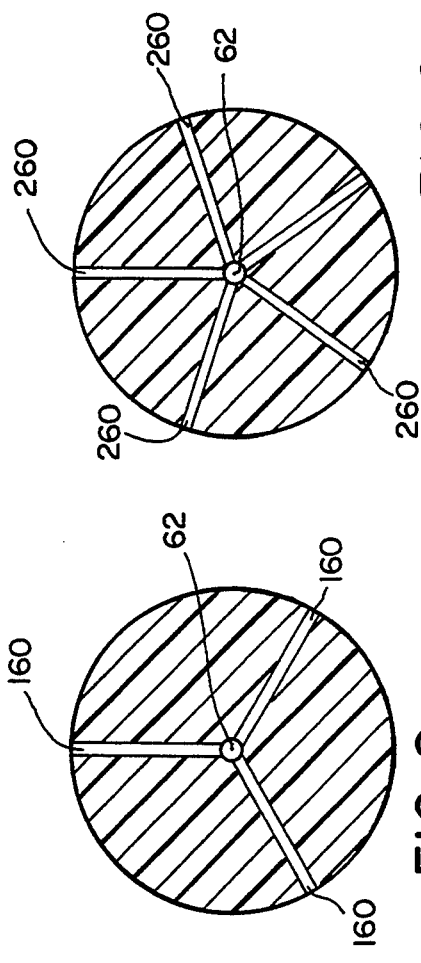
FIG. 7
FIG. 9
FIG. 8

ON-LINE FISHING DEPTH INDICATOR

This application is a continuation application of Ser. No. 07/845,913 filed Mar. 4, 1992, now abandoned.

BACKGROUND OF THE INVENTION

1. Field of the Invention

The subject invention is generally related to a device for determining the water depth of fishing lures and the like and is specifically directed to an on-line indicator for monitoring the depth of fishing bait as it is pulled through the water.

2. Description of the Prior Art

With the development of electronic devices for determining water depth and determining the location of objects in the water, numerous electronic systems have been developed to aide fishing enthusiasts in locating and catching fish. For example, "fish finders" are well known and are used to determine the location of schools of fish in a body of water. The more sophisticated fish finders not only locate the school but indicate the depth of the school within the specific location. It is common to troll crank bait, lures and other baits through the water in the vicinity of the school in an effort to attract the fish toward the bait and draw a strike. Typically, this is accomplished by paying out a specific amount of fishing line from a rod and reel located within a boat and then trolling the boat across the surface of the water in the vicinity of the school at a specific speed.

It is common knowledge that different types of bait, dependent on configuration, weight, hydrodynamics and other factors will troll through the water at different, predictable depths. The depth of the bait being pulled through the water is also dependent upon the amount of line paid out from the rod and the speed at which the boat is trolling through the water. It is desirable to know with certainty at what depths specific baits will troll through the water under predefined conditions. For example, if a school of fish is found to be at eight feet below the surface of the trolling boat, it is advantageous to know what bait can be secured to the line to troll through the water in the vicinity of eight feet, greatly increasing the chances for drawing fish toward the bait. In a typical example, if 200 feet of line is paid out from the boat and the boat is trolling through the water at three miles per hour, specific baits will troll through the water at a predetermined and predictable depth. In the past, the depth of the bait has been determined through trial and error and at best the results have been less than accurate. However, detailed log books have been created cataloging the performance of various baits under controlled conditions. Tournament participants, in particular, have relied on these log books in an effort to use bait consistent with the conditions in an effort to obtain predictable results. Such efforts have met with spotty success.

While various water depth monitoring devices have been available, there are no known devices specifically dealing with this subject problem. That is, there are no known devices in the prior an for monitoring the depth at which specific baits operate under predetermined, controlled conditions.

Examples of depth indicators for use in sport fishing, tournament fishing and the like are shown, for example, in U.S. Pat. No. 2,821,805 issued to W. Kunze on Feb. 4, 1958 and U.S. Pat. No. 3,038,143 issued to W. Dow on Jun. 5, 1962. The Kunze patent discloses a fish finding apparatus having a depth gauge attached to a net and adapted for pulling the net through the water at a specific depth in order to increase the chances that the net will be pulled through a school of fish. The Dow patent discloses a telemetering depth meter and a hydrophone adapted for pulling a net through the water at a specific depth. Both the Kunze and Dow patents are particularly suited for commercial fishing. Neither of these devices is readily capable for sport fishing and is not adaptable for determining the operating depth of specific baits.

Examples of depth sensitive transducers are shown in U.S. Pat. No. 3,308,425 issued to McLoad on Mar. 7, 1967; U.S. Pat. No. 4,225,952 issued to Lewis on Sept. 30, 1980; U.S. Pat. No. 4,926,397 issued to Robertson on May 15, 1990; and U.S. Pat. No. 4,943,951 issued to Leavell et al on Jul. 24, 1990. Each of these patents discloses various circuitry and devices for measuring water depth through utilization of a pressure transducer or the like. Examples of depth indicators for use by boaters and divers are disclosed in U.S. Pat. No. 2,774,881 issued to Rich on Apr. 13, 1954 and U.S. Pat. No. 3,857,283 issued to Jennings et al on Dec. 31, 1974, respectively.

While depth finding apparatus are well known, none of the art discloses a device which is specifically directed to determining the performance of fishing bait pulled through the water by a moving fishing line in a trolling operanon.

SUMMARY OF THE INVENTION

The subject invention is specifically directed to an on-line fishing depth indicator for determining the performance of a bait pulled through the water under specific, predetermined conditions. The fishing depth indicator of the subject invention has a hydrodynamic design permitting it to be pulled through the water with the bait without interfering with the performance of the bait, giving an accurate reading of the performance of the bait as it is trolled through the water. The preferred embodiment of the invention permits the indicator to be pulled through the water either in series with or in parallel with the subject bait without impairing the depth performance of the bait. The depth indicator may be secured in advance to the bait or in a trailing position behind the bait while still giving an accurate readout.

In its preferred form, the depth indicator is a generally torpedo shape and includes a ring fastener by which the depth indicator may be secured directly to a fishing line swivel or a bait swivel or the like. All of the components and power units for operating the depth indicator are contained within the torpedo-shaped housing.

In the preferred embodiment, a visual readout is provided for indicating the maximum depth the bait has reached during the trolling operation. Preferably, the indicator includes a transparent window through which an LCD readout may be read for visually ascertaining the maximum depth of the bait. In the preferred form, the depth may be read in either the English or metric system.

The body of the depth indicator may be constructed of a transparent plastic material, making all of the components including the readout readily visible from the exterior of the unit. The torpedo shape of the housing is made of several sections, wherein the electronic circuitry and power supply may be placed in a hermetically sealed cavity within the housing and the transducer may be placed in an isolated chamber which is in direct communication with the water through a uniform series of ports, by which the water pressure is monitored and measured.

It is preferred that the control circuitry associated with the pressure transducer include a programmable means for calibrating the signal to accommodate for any inaccuracies in performance which may be caused by the presence of the indicator in the system. Thus, the readout provides a calibrated signal indicating the predicted performance depth of the bait when the depth indicator is not present.

The fishing depth indicator of the subject invention is designed to be easily used, with a minimum of training required, for producing accurate, predictable and repeatable results for logging the performance of specific baits under predetermined conditions. Use of the fishing depth indicator of the subject invention greatly enhances the performance of the bait by providing accurate, predictable information relating to bait action under controlled conditions.

It is, therefore, an object and feature of the subject invention to provide a fishing depth indicator for producing accurate information relating to the performance of specific fishing bait under controlled conditions.

It is another object and feature of the subject invention to provide an on-line fishing depth indicator which may be used in combination with specific bait to determine the specific performance of the bait under controlled conditions.

It is an additional object and feature of the subject invention to provide an on-line fishing depth indicator which may be used in combination with the bait without impairing the performance of the bait in order to determine accurate information relating to the bait performance.

It is yet another object and feature of the subject invention to provide a fishing depth indicator which may be connected in series on a fishing line with the bait either in a trailing or a leading position.

It is yet another object and feature of the subject invention to provide an on-line fishing depth indicator which may be connected in parallel with a specific bait in order to determine the performance of the bait under specific conditions.

It is another object and feature of the subject invention to provide a calibrated readout giving an accurate indication of the performance of the bait, compensating for any inaccuracies created by the presence of the fishing depth indicator during monitoring operations.

Other objects and features of the subject invention will be readily apparent from the accompanying drawings and detailed description of the preferred embodiment.

BRIEF DESCRIPTION OF THE DRAWINGS

FIG. 4 is a view similar to FIG. 1, showing the fishing depth indicator in series with the indicator in a wailing position relative to a crank bait.

FIG. 5 is a view similar to FIG. 1, showing the indicator in parallel with a crank bait.

FIG. 6 is a view similar to FIG. 2, showing an alternative embodiment of the fishing depth indicator.

FIG. 7 is an exploded view of the fishing depth indicator of FIG. 6.

FIG. 8 is a view similar to FIG. 3 illustrating an alternative configuration for the pressure ports.

FIG. 9 is a view similar to FIG. 3 showing another alternative configuration for the pressure ports.

DETAILED DESCRIPTION OF THE PREFERRED EMBODIMENT

Figure 1:
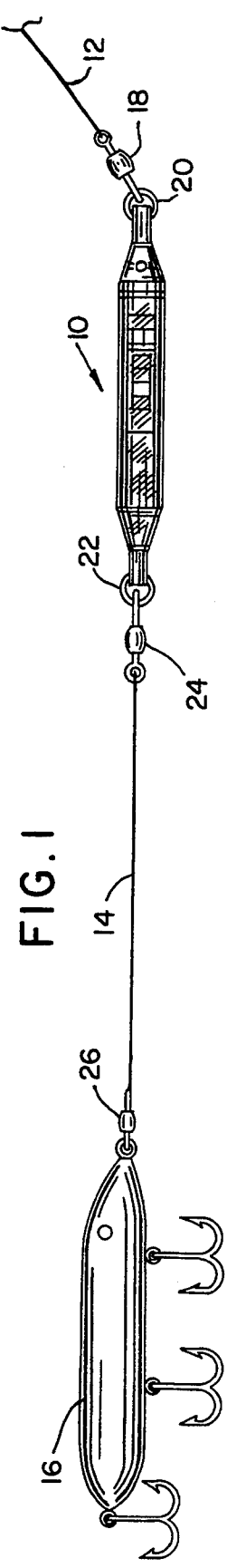
FIG. 1 is a plan view of the fishing depth indicator of the subject invention, shown in series in a leading position relative to a crank bait, as secured to a typical fishing line.

The fishing depth indicator 10 of the subject invention is shown in FIG. 1 as attached to a typical fishing line 12, a leader 14 and crank bait 16. In a typical application, a swivel connector 18 is disposed at the end of the fishing line 12. The depth indicator 10 includes a ring 20 at the outer end of the fish depth indicator and adapted for receiving the connector associated with the swivel 18. Likewise, a second ring 22 may be provided at the opposite end of the fishing depth indicator and is adapted to be secured in the connector of the swivel 24. The swivel 24 is secured to the leader 14 which is attached to a swivel connector 26 for supporting the crank bait or lure 16.

In the embodiment of FIG. 1, the fishing depth indicator 10 is shown in series and in a leading position with the crank bait 16 on the line 12. That is, it is in advance of the crank bait 16 on the line 12. The crank bait 16 may also be placed in a leading, series position with the depth indicator 10 as shown in FIG. 4 or in parallel as shown in FIG. 5. In the configuration of either FIGS. 4 or 5, the second ring 22 may be eliminated. Specifically, as shown in FIG. 4, a swivel 18 is connected to line 12 for mounting the crank bait 16. The leader 14 is secured to the trailing end of the bait and includes a swivel 14 adapted for receiving the ring 20 of the depth indicator 10. In FIG. 5, a multiple swivel 19 is secured to the end of line 12 with one end 21 attached to leader 14 for securing the crank bait and the other end 23 secured to the ring 20 of the depth indicator 10.

Figure 2:
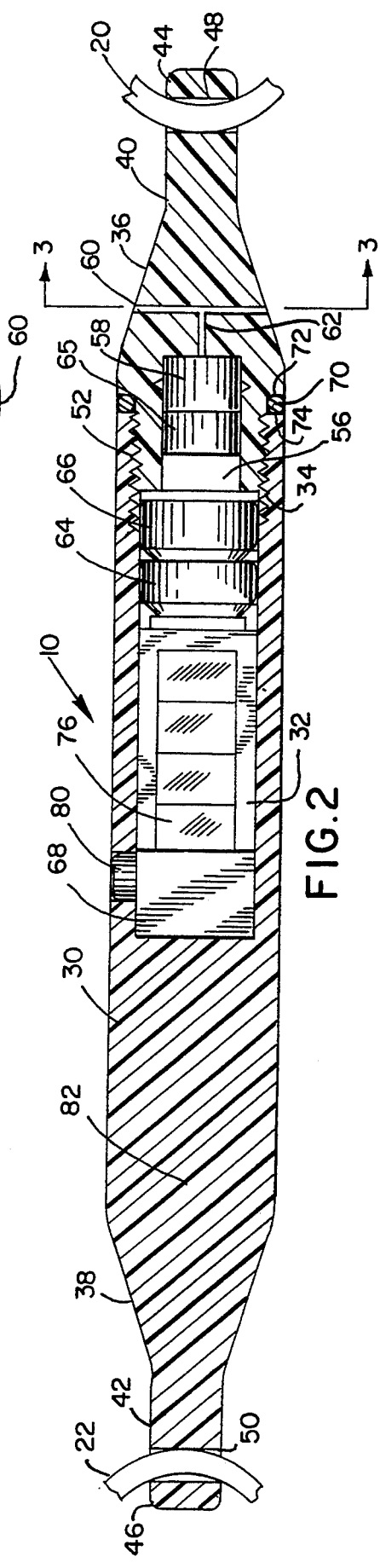
FIG. 2 is an enlarged sectional view of the fishing depth indicator of FIG. 1.

A sectional view of one embodiment of the fishing depth indicator is shown in FIG. 2. As there shown, the indicator 10 includes an elongated cylindrical body 30 having a central axial hollow core 32 with an open end having a female threaded portion 34. The cylindrical body 30 terminates in an outer, substantially conical end portion 36 and 38, giving the indicator body a substantially torpedo shape providing a minimum of resistance when pulled through the water. In the preferred embodiment, each of the respective ends 36, 38 terminate in a reduced cylindrical portion 40 and 42 having rounded outer ends 4-4, 46, respectively. A through channel 48 is provided in end 36 for receiving the circular ring 20. A similar through channel 50 is provided at the opposite outer end 38 for the circular ring 22. The rings 20 and 22 are used to attach the fish depth indicator to a fishing line in any of the arrangements shown in FIGS. 1, 4 or 5.

Figure 3:
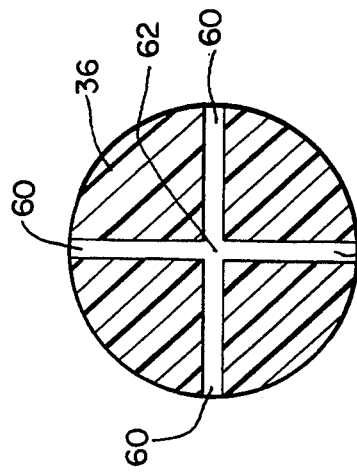
FIG. 3 is a sectional view taken generally along the line 3—3 of FIG. 2.

In the embodiment shown in FIG. 1—3, the end 36 of the fish indicator 10 is removable and includes a reduced male threaded portion 52 which is mated with the female threaded portion 34 of the cylindrical body portion 30. The releasable end 36 includes an elongated cylindrical chamber 56 which forms a part of the cavity 32. In the preferred embodiment, the chamber 56 is adapted for receiving a pressure transducer 58 which is in communication with the pressure ports 60 through the channel 62. The transducer 58 may be potted in the chamber 56 in the typical manner, as shown by the epoxy based potting compound 64. Leads (not shown) extend outwardly from the transducer 58 through the potting compound 64 and into the cavity 32, by which the transducer is powered via battery cells 65, 66 and connected to the control circuitry as shown at 68.

In the preferred form of the invention, a sealing ring 70 is provided and mounted on the reduced portion 52 of the end 36. A shoulder 72 is provided on the releasable end and a complementary shoulder 74 is provided on the outer end of the cylindrical body 30. As the releasable end is threaded into and secured in the body 30, the shoulders 72 and 74 compress the ring 70 to form a water-tight seal, sealing the cavity 32 and chamber 56, creating a water-tight compartment for the electronics of the indicator.

Alternative preferred embodiments of the invention are shown in FIGS. 6 and 7. As there shown, the indicator pin includes the elongate body 30, as in the configuration of FIG. 2. However, unlike the configuration of FIG. 2, the forward end 236 of this configuration is permanently secured to the body 30 by sonic welding or the like in an end cavity 237 provided in the body. The transducer 58 is mounted in the end portion 236 and is typically potted therein as shown at 64 with leads 235 and 239 being received in the axial channel 240 in the body 30 for connecting the transducer 58 to the electronic circuit module 68. The electronic module 68 is carried in an enlarged cavity 232 corresponding to the cavity 32 of the embodiment of FIG. 2. The electronic circuitry is contained in the cavity 232 by a sealing ring 233.

As is particularly shown in FIG. 6, the battery cells 65 and 66 may either be contained in a battery chamber provided at the outer end of the housing 30, or as shown in FIG. 7, may be contained in a chamber or cavity provided in the end cap 238. The location of the batteries is largely dependent on size constraints. The outermost end of the body 30 of the configurations of FIGS. 6 and 7 is internally threaded as at 241 for receiving the male threaded portion 242 of the end cap 238. An O-ring seal 244 or the like is provided on the end cap 238 for hermetically sealing the end cap when it is tightly turned down on threads in the body 30. This assures a water-tight compartment for the battery cells 65 and 66.

It will be noted that the configuration shown in FIGS. 6 and 7 includes an end cap 238 which is not adapted for receiving a trailing ring 22. This particular configuration is designed to be used when the indicator 10 is placed in a trailing position as shown in FIG. 4 or a parallel position as shown in FIG. 5. Of course, it will be readily understood to those who are skilled in the art, that the end cap 238 could be modified to include a through channel 50, as with the configuration of FIG. 2, for receiving a second mounting ring 22.

The body of the indicator is preferably made of a transparent plastic material such as, by way of example, Lexan type polycarbonate. This permits the electronic components to be readily visible from the exterior of the indicator. A visual display unit 76 is mounted in the cavity 32 of the indicator body 30 and includes an LCD readout display or the like which is visible through the exterior of the body. This permits the measurements taken by the transducer 58 to be read without dismantling the indicator. In the preferred embodiment, a sequencing switch 80 is provided and is in communication with the control circuit 68 for controlling the power supply and the LCD module 76. In the preferred embodiment of the invention, the sequencing switch is adapted to be sequenced through four operative modes as follows: "ON/OFF", "ENGLISH", "METRIC", "BATTERY CONDITION". That is, in operation of the device, before the indicator is submerged in the water, the sequencing switch is depressed to turn the unit "ON". The unit is then adapted for determining the greatest depth reached by the indicator during the trolling operation. This depth is stored in the memory of the control unit 68. When the indicator is removed from the water, the switch 80 is again depressed to indicate the depth in feet. Where desired, the indicator may again be depressed to determine the depth in meters. After the depth has been read, the unit may be turned off by again depressing the switch 80. When the switch is again depressed to energize the unit, it is reset for a second operation.

The ports 60 in the end cap 36 are illustrated in FIG. 3. In the configuration there shown, the ports are disposed at 90° relative to one another and intersect at a common point which is defined by the channel 62 which is in communication with the transducer 58 in the cavity 56. It has been found that the ports are operative to provide a good pressure reading for determining the depth of the indicator when the taper angle of the tapered end 36 of the indicator intersects the central longitudinal axis 82 at an angle of approximately 10° to 14°. The ports 60 are then disposed in a plane which intersects the longitudinal axis 82 at 90°. Each orifice is an elongate, cylindrical channel having an orifice diameter of approximately 0.06 inches. The axial channel 62 connecting the ports to the transducer has an internal diameter of approximately 0.085 inches.

Alternate configurations of the pressure ports are shown in FIGS. 8 and 9. Three equally spaced ports 160 may be placed in a plane orthogonal to the central axis 82 and the radially spaced at 120° as shown in FIG. 8. These ports are also cylindrical and are of an orifice diameter of approximately 0.06 inches. The five port system of FIG. 9 has also been shown to be satisfactory for use in connection with the subject invention. As there shown, the ports 260 are spaced radially about the body by a radial angular displacement of 72°. The orifice diameter is approximately 0.06 inches.

As is best shown in FIG. 2, the radial ports are disposed in a plane orthogonal to the central axis 82 of the indicator. The axial port 62 connecting the radial ports 60 with the end cap chamber 56 provides a pressure reading at the chamber opening 84 of the port. The transducer is adapted to be placed in the chamber 56 with the transducer membrane in communication with the port opening 84. A small annular groove 86 is provided in the chamber 56 and provides alignment and attachment locators for the transducer when it is potted in the chamber 56.

In the preferred embodiments, the cylindrical body of the indicator has a length of approximately 2.2 inches and an outer diameter of approximately 0.5 inches. The tapered ends intersect the longitudinal axis at an angle of approximately 10° to 14°. The specific gravity of the assembled indicator is maintained close to one so that the indicator does not interfere with the depth of the crank bait.

Figure 10:
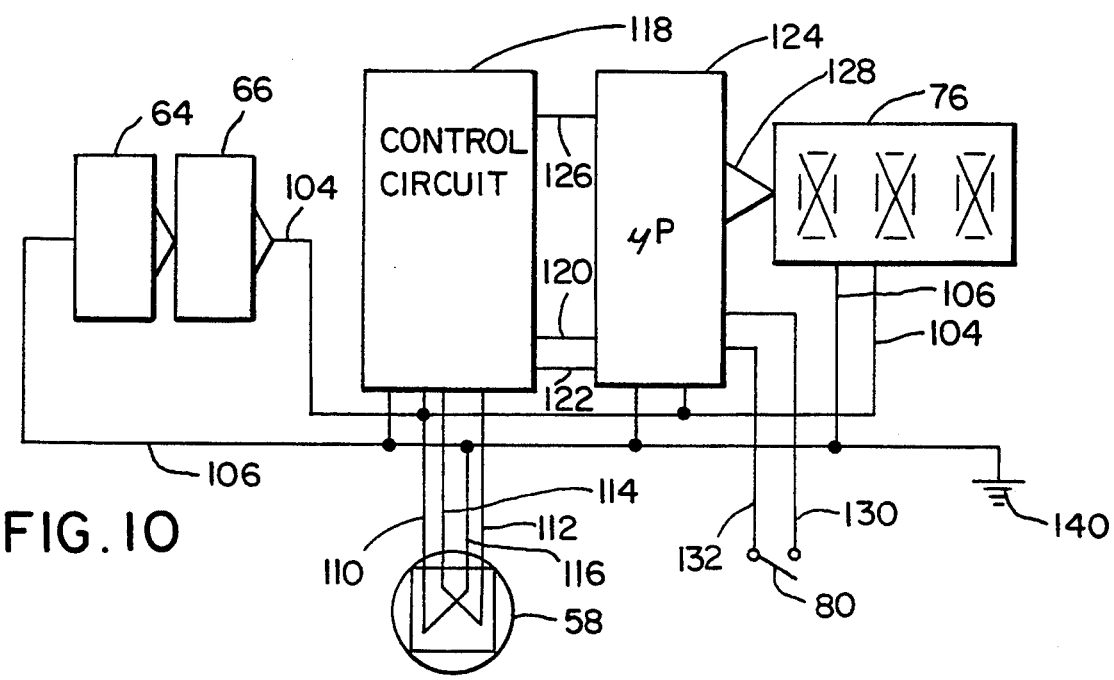
FIG. 10 is a block diagram of the pressure transducer and control circuit for the subject invention.

A block circuit diagram for the electronic circuitry of the indicator of the preferred embodiment is shown in FIG. 10. As there shown, two cadmium cell volt batteries 65, 66 or the like are connected in series and provide the power supply for the unit. The one side of the batteries is attached to a lead 104 and the other or ground side of the batteries is attached to lead 106. The power lead 104 is secured to a three digit liquid crystal display unit 76 with a return to ground 106 as shown. The pressure transducer 58 is connected directly to the power supply via leads 110 and 112 and to the control circuitry via leads 114 and 116. The control leads 114 and 116 are attached to an amplifier, converter circuit as is shown at 118. The transducer output signal present on lines 114 and 116 is introduced into the amplifier circuit 118 from which it is introduced via lead 126 into the microprocessor 124. This output corresponds to the pressure sensed by the pressure transducer 58, in the well known manner. The raw signal present on lines 114 and 116 is conditioned by the circuitry indicated by the components 118 to produce a conditioned data signal on line 126. The microprocessor 124 calibrates and modifies the signal, producing an electrical output at 128 which is introduced into the three digit LCD. The three digit LCD display unit permits readings in feet or meters to the nearest tenth between zero and 100 feet or zero and 100 meters. A control switch 80 is provided and is in communication with the microprocessor via leads 130 and 132. The control switch 80 of the subject invention is a sequencing switch with four modes of operation as previously described. The control signal produced by the microprocessor in response to the switch action is output on lead 132 and is introduced via the control leads 120 and 122 to the amplifier circuit 118 and the transducer 58. The control line also activates the power supply provided by batteries 65 and 66 for powering the control unit and the LCD display.

Figure 11:
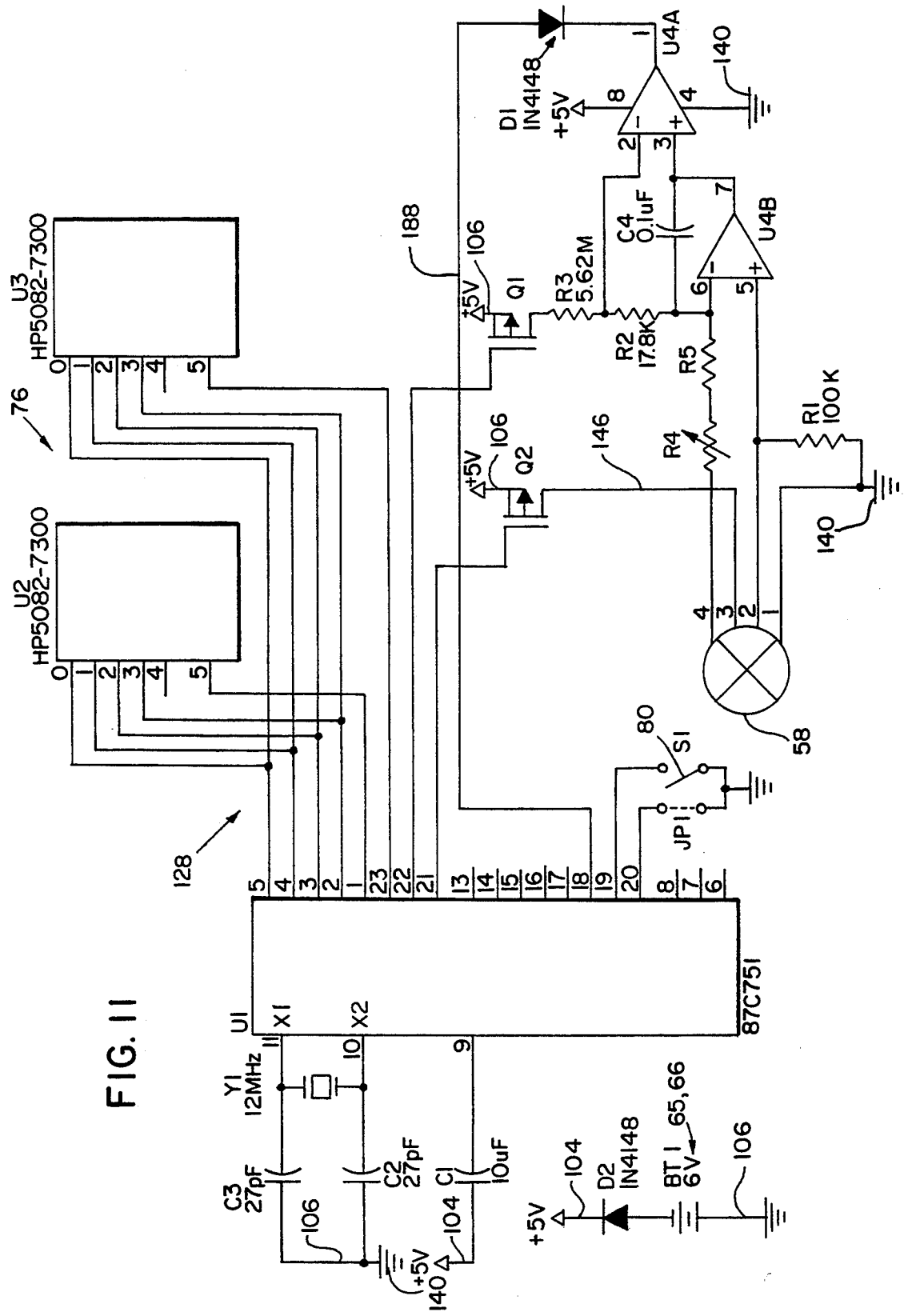
FIG. 11 is a schematic diagram of a circuit in accordance with FIG. 10.

An exemplary schematic diagram for the circuit of the subject invention is shown in FIG. 11. As there shown, the positive power supply from the battery units 65, 66 is indicated by the line 104. The ground side of the battery unit is indicated by the ground symbol 140 which corresponds to and is connected to the lead 106. The power or positive side of the power supply is connected to a pair of BS250 mosfets Q1 and Q2. The emitter of mosfet Q2 is connected to the positive power lead 146 of the transducer 58. The mosfet Q1 is connected to the discrete LT1013 amplifiers U4A and U4B. An IN4148 filtering diode D1 is provided on the output side of the amplifier to smooth out the amplified, conditioned output signal from the transducer 58. The output signal from the transducer is a voltage drop provided on pins 2 and 4. The output on pin 7 of the amplifier U4B is introduced into pin 3 of amplifier U4A. The conditioned output on pin 1 of amplifier U4A is introduced through the diode D1 and via line 188 into pin 18 of the 87C751 microprocessor 124.

The signal introduced on line 188 is calibrated and modified by the microprocessor and is output on pins 1, 2, 3, 4 and 5 into the transfer bus 128 which is the input to the three digit LCD unit 108. In the preferred embodiment, three digit LCD unit comprises the HP5082-7300 displays U2, U3. In the preferred embodiment, three distinct LCD windows are provided, permitting readings of 0 to 100 to the nearest 10th. There may also be provided an LCD indicator which is illuminated when the display is in meters and is not illuminated when the display is in feet, as controlled by the program in the microprocessor.

A control switch 80 is connected to pins 19, 20 of the microprocessor. By holding this switch in position it will sequence through the following five operations: "ON-OFF", "FEET", "METERS", "BATTERY CONDITION". A mosfet control signal for controlling the mosfets Q1 and Q2 is output on pins 21, 22 of the microprocessor. This permits the microprocessor to only power up the amplifier circuits and the transducer on an intermittent, controlled basis, minimizing the use of power from the battery supplies during operation, greatly enhancing the product use by providing substantially longer battery life.

In the preferred embodiment, the pin numbers used are those of the manufacturer. The microprocessor 124 is an 87C751 manufactured by Signetics. The transducer 58 is an 1800 Series manufactured by Foxboro. The U2, U3 displays are HP5082-7300 modules manufactured by Hewlett-Packard.

The copyrighted program for the 87C751 microprocessor, for controlling the various components of the circuitry and for calibrating the data signals is as follows:

```
1    $TITLE(BAIT-DATA SOFTWARE)
2    $SUBTITLE(By Michael J. Barker)
3    $CR(Copywright (C) 1992, BAIT-DATA, INC.)
4    $VERSION(02.00)
5    $DATE(02/28/92)
6    $MODNAME(BAITDATA)
8    $REGISTERBANK(0,1,2,3)
9    $ALLPUBLIC
10   $SHOWINCS
11
12   ;---------------------------------------------------------------
13
14   ;                    BAIT-DATA SOFTWARE
15
16   ;              Provided by Dill Instruments Inc.
```

```
17  ;                 Software Engineer : Michael J. Barker
18  ;                 Project Manager   : John J. Dill II
19
20  ;--------------------------------------------------------------------
21  ;                    VARIABLES    -    DEFINITIONS
22  ;--------------------------------------------------------------------
23

3  $SETLNSRCH(DEFS751.ASM);%INCLUDE    <DEFS751.ASM>
 1  ; ************* Predefined Data and Bit and Interrupt Addresses *************
 2  ; ******************** for the Signetics 87C751 ****************************
 3
 4  $NOALLPUBLIC          ; This prevents these addresses from
 5                        ; being multiply-defined, if this file
 6                        ; is included in more than one file
 7                        ; which uses the ALLPUBLIC option.
 8
 9  ; ----------------- Predefined Bit Addresses --------------------
10
11          DEFSEG BITSYM751,CLASS=DATA
12          SEG BITSYM751
13
14                            ;       PROGRAM STATUS WORD     ($D0)
15  CY      TEQ     $D7       ; PSW.7       Carry
16  AC      TEQ     $D6       ; PSW.6       Aux Carry
17  F0      TEQ     $D5       ; PSW.5       Flag 0
18  RS1     TEQ     $D4       ; PSW.4       Register Bank Select Bit 0
19  RS0     TEQ     $D3       ; PSW.3       Register Bank Select Bit 1
20  OV      TEQ     $D2       ; PSW.2       Overflow
21  P       TEQ     $D0       ; PSW.0       Parity
22
23                            ;       INTERRUPT ENABLE        ($A8)
24  EA      TEQ     $AF       ; IE.7        Enable All Selected Interrupts
25  EI2     TEQ     $AC       ; IE.4        I2C Serial
26  ET1     TEQ     $AB       ; IE.3        Timer 1 Overflow
27  EX1     TEQ     $AA       ; IE.2        External 1
28  ET0     TEQ     $A9       ; IE.1        Timer 0 Overflow
29  EX0     TEQ     $A8       ; IE.0        External 0
30
31              .
32                            ;       TIMER CONTROL           ($88)
33  GATE    TEQ     $8F       ; TCON.7      Timer 0 Gate
34  CT      TEQ     $8E       ; TCON.6      Counter / Timer
35  TF      TEQ     $8D       ; TCON.5      Timer 0 Overflow
36  TR      TEQ     $8C       ; TCON.4      Timer 0 Run
37  IE0     TEQ     $8B       ; TCON.3      INT0 Edge Detected
38  IT0     TEQ     $8A       ; TCON.2      INT0 Edge Triggered
39  IE1     TEQ     $89       ; TCON.1      INT1 Edge Detected
40  IT1     TEQ     $88       ; TCON.0      INT1 Edge Triggered
41
42                            ;       I2C CONTROL             ($98)
43  RDAT    TEQ     $9F       ; I2CON.7
```

```
44  ATN     TEQ     $9E     ; I2CON.6
45  DRDY    TEQ     $9D     ; I2CON.5
46  ARL     TEQ     $9C     ; I2CON.4     - READ DEFINITIONS -
47  STR     TEQ     $9B     ; I2CON.3
48  STP     TEQ     $9A     ; I2CON.2
49  MST     TEQ     $99     ; I2CON.1
50
51  CXA     TEQ     $9F     ; I2CON.7
52  IDLE    TEQ     $9E     ; I2CON.6
53  CDR     TEQ     $9D     ; I2CON.5
54  CARL    TEQ     $9C     ; I2CON.4     - WRITE DEFINITIONS -
55  CSTR    TEQ     $9B     ; I2CON.3
56  CSTP    TEQ     $9A     ; I2CON.2
57  XSTR    TEQ     $99     ; I2CON.1
58  XSTP    TEQ     $98     ; I2CON.0
59
60                          ;       I2C CONFIGURE       ($D8)
61  SLAVEN  TEQ     $DF     ; I2CFG.7
62  MASTRQ  TEQ     $DE     ; I2CFG.6
63  CLRT1   TEQ     $DD     ; I2CFG.5     - Reads Back as 0
64  T1RUN   TEQ     $DC     ; I2CFG.4
65  CT1     TEQ     $D9     ; I2CFG.1
66  CT0     TEQ     $D8     ; I2CFG.0
67
68                          ;       I2C STATUS          ($F8)
69  IDLESTA TEQ     $FE     ; I2STA.6
70  XDATA   TEQ     $FD     ; I2STA.5
71  XACTV   TEQ     $FC     ; I2STA.4
72  MAKSTR  TEQ     $FB     ; I2STA.3
73  MAKSTP  TEQ     $FA     ; I2STA.2
74  XSTRSTA TEQ     $F9     ; I2STA.1
75  XSTPSTA TEQ     $F8     ; I2STA.0
76
77                          ;       PORT 0              ($80)
78  SDA     TEQ     $81     ; P0.1
79  SCL     TEQ     $80     ; P0.0
80
81                          ;       PORT 1              ($90)
82  T0      TEQ     $97     ; P1.7
83  INT1    TEQ     $96     ; P1.6
84  INT0    TEQ     $95     ; P1.5
85
86  ; ----------------- Predefined Data Addresses -----------------
87
88          DEFSEG REGSYM751,CLASS=DATA
89          SEG REGSYM751
90
91  ACC     TEQ     $E0     ; Bit Addressable
92  B       TEQ     $F0     ; Bit Addressable
93  PSW     TEQ     $D0     ; Bit Addressable
94  SP      TEQ     $81
```

```
95    DPL     TEQ     $82
96    DPH     TEQ     $83
97    P0      TEQ     $80     ; Bit Addressable
98    P1      TEQ     $90     ; Bit Addressable
99    P3      TEQ     $B0     ; Bit Addressable
100   IE      TEQ     $A8     ; Bit Addressable
101   TCON    TEQ     $88     ; Bit Addressable
102   TL      TEQ     $8A
103   TH      TEQ     $8C
104   RTL     TEQ     $8B
105   RTH     TEQ     $8D
106   I2CON   TEQ     $98     ; Bit Addressable
107   I2DAT   TEQ     $99
108   I2CFG   TEQ     $D8     ; Bit Addressable
109   I2STA   TEQ     $F8     ; Bit Addressable
110   PCON    TEQ     $87
111
112   ; --------------- Interrupt Vector Addresses -----------------
113
114   RESET   TEQ     $00
115   EXTI0   TEQ     $03
116   TIMER0  TEQ     $0B
117   EXTI1   TEQ     $13
118   TIMER1  TEQ     $1B
119   I2C     TEQ     $23
120
121   $ALLPUBLIC      ; This makes symbols PUBLIC from this point in the
122                   ; file down.  Remove this $ALLPUBLIC line if you
123                   ; don't want symbols made PUBLIC.
124   $RESETLN
125
126   ;       Register Bank 0         Definitions             Data Storage
127
128           SEG     REG0
129
130   INDEX0  EQU     R0      ; General Purpose Index Register
131   INDEX1  EQU     R1      ; General Purpose Index Register
132   CORRL   EQU     R2      ; Corrected A/D Data                    Low
133   CORRH   EQU     R3      ; Corrected A/D Data                    High
134   RAWL    EQU     R4      ; Raw A/D Count From Integrator         Low
135   RAWH    EQU     R5      ; Raw A/D Count From Integrator         High
136   OFFSETL EQU     R6      ; Zero Offset Correction Coefficient    Low
137   OFFSETH EQU     R7      ; Zero Offset Correction Coefficient    High
138
139   ;------------------------------------------------------------------
140
141           DEFSEG VAR,CLASS=DATA
142           SEG VAR
143
144   PSIDEC  EQU     $08     ; PSI BCD Data
145   PSIHEX  EQU     $09     ; PSI Hex Data
```

```
46   PEAKDEC  EQU     $0A             ; Peak BCD Data
47   PEAKHEX  EQU     $0B             ; Peak Hex Data
48   HOLDCNT  EQU     $0C             ; Hold Count
49   PTRL     EQU     $0D             ; Pointer For Timer 0 Interrupt Vector  Low
50   PTRH     EQU     $0E             ; Pointer For Timer 0 Interrupt Vector  High
51
52   LEDPORT  EQU     P3              ;
53
54   ;-------------------------------------------------------------------
55
56            DEFSEG  FLAGS,CLASS=BIT
57            SEG     FLAGS
58
59   OVRFLG   EQU     $00             ; ($20.0) PSI Overrange
60   NEGFLG   EQU     $01             ; ($20.1) PSI Underrange
61   TOROLL   EQU     $02             ; ($21.2) Timer 0 Rollover
62   ROLFLG   EQU     $03             ; ($21.3) A/D Count Rollover
63   GOFLG    EQU     $04             ; ($21.4) Do 600mS Work
64   LZB      EQU     $05             ; ($21.5) Leading Zero Blanking
65
66   ;-------------------------------------------------------------------
67   ;           CONSTANTS      -       DEFINITIONS
68   ;-------------------------------------------------------------------
69
70            DEFSEG  CONST,CLASS=CODE
71            SEG     CONST
72
73   HOLDCYC  EQU     12              ;
74   CALCYC   EQU     01              ;
75
76   ;-------------------------------------------------------------------
77   ;           I/O PORTS      -       DEFINITIONS
78   ;-------------------------------------------------------------------
79
80            DEFSEG  PORT,CLASS=BIT
81            SEG     PORT
82
83   LED1     EQU     P3.0            ;
84   LED2     EQU     P3.1            ;
85   LED4     EQU     P3.2            ;
86   LED8     EQU     P3.3            ;
87   DIGIT10  EQU     P3.4            ;
88   DIGIT1   EQU     P3.5            ;
89   RAMPDN   EQU     P3.6            ;
90   RAMPUP   EQU     P3.7            ;
91
92   EOC      EQU     P1.5            ; Output From Zero Crossing Comparator
93   SWITCH   EQU     P1.6            ; 1 = Power On Strobe & EXT-1IRQ For Wake Up
94   TEST     EQU     P1.7            ; Test Pin - Shows PSI When Grounded
95
96   ;-------------------------------------------------------------------
```

```
 97    ;                     INTERRUPT VECTOR POINTERS
 98    ;-------------------------------------------------------------------
 99
100            DEFSEG   PORVEC,START=RESET,CLASS=CODE
101            SEG      PORVEC           ; Reset IRQ Vector @ $00
102
103            AJMP     POR              ; Cold Start Routine (Power On Reset)
104
105    ;-------------------------------------------------------------------
106
107            DEFSEG   EXTOVEC,START=EXTIO,CLASS=CODE
108            SEG      EXTOVEC          ; External #0 IRQ Vector @ $03
109
110            AJMP     EOCINT           ;
111
112
113    ;-------------------------------------------------------------------
114
115            DEFSEG   TMROVEC,START=TIMER0,CLASS=CODE
116            SEG      TMROVEC          ; Timer #0 IRQ Vector @ $0B
117
118            PUSH     PTRL             ; RET Instruction Loads .PC With Address Just
119            PUSH     PTRH             ; Pushed Onto Stack, Indirect Jump To Improve
120            RET                       ; Response Time of Interrupts (6 Cyc / 14.6 uS)
121
122    ;-------------------------------------------------------------------
123    ;                        INTERRUPT ROUTINES
124    ;-------------------------------------------------------------------
125
126            DEFSEG   EXTOIRQ,CLASS=CODE
127            SEG      EXTOIRQ
128
129    EOCINT:
130            CLR      TR               ; Shut Off Timer For 3 Cycles
131            MOV      RAWL,TL          ; Save Low Count In RAWL
132            MOV      RAWH,TH          ; Save High Count In RAWH
133            SETB     TR               ; Turn Timer Back On
134            CLR      EOC              ; Short Input To Ground To Avoid Spurious IRQ's
135            MOV      C,TOROLL         ; Get Rollover Status
136            MOV      ROLFLG,C         ; Let Correction Routine Know About it
137            RETI                      ;
138
139    ;-------------------------------------------------------------------
140
141            DEFSEG   TIMER0IRQ,CLASS=CODE
142            SEG      TIMER0IRQ
143
144    INT:                              ; Integration Time = 160mS
145            CLR      TOROLL           ; Reset Rollover Indicator
146            CLR      RAMPUP           ; Switch Circuit To Integrate Signal
147            SETB     RAMPDN           ; Turn Off Reference Current
148            MOV      PTRL,#LOW(MEAS)  ; Point Timer 0 Interrupt To Measurement Phase
```

```
149          MOV     PTRH,#HIGH(MEAS);
150          RETI                    ;
151
152  MEAS:                           ; Measurement Time = 160mS
153          CLR     RAMPDN          ; Switch Circuit To De-Integrate
154          SETB    RAMPUP          ; Turn On Reference Current
155          MOV     PTRL,#LOW(IDL)  ;
156          MOV     PTRH,#HIGH(IDL) ; Point Timer 0 Interrupt To Idle Phase
157          SETB    EOC             ; Make Input Hi-Z
158          RETI                    ;
159
160  IDL:                            ; Idle Time = 160mS
161          SETB    TOROLL          ; Mark Rollover Of Timer 0
162          SETB    GOFLG           ; Tell Main That Data is Ready
163          MOV     PTRL,#LOW(INT)  ;
164          MOV     PTRH,#HIGH(INT) ; Point Timer 0 Interrupt To Integrate Phase
165          RETI                    ;
166
167  ;----------------------------------------------------------------
168  ;                    CALIBRATION PROCEDURE
169  ;----------------------------------------------------------------
170
171          DEFSEG  CALIBRATION,CLASS=CODE
172          SEG     CALIBRATION
173
174
175  DOCAL:           PROC            ;
176
177          CLR     A               ; Zero Accumulator
178          MOV     PSIHEX,A        ; Zero Any Existing Calculated Depth
179          MOV     PSIDEC,A        ;
180
181          MOV     R0,#CALCYC      ;
182
183  MORCAL: ORL     PCON,#01        ;
184          ORL     PCON,#01        ;
185          ORL     PCON,#01        ; Do Conversion
186
187          DJNZ    R0,MORCAL       ;
188
189          MOV     $06,RAWL        ; Move Raw Counts To Offset
190          MOV     $07,RAWH        ;
191          MOV     CORRL,#00       ; Zero Corrected Counts
192          MOV     CORRH,#00       ;
193
194          RET                     ;
195
196  DOCAL:           ENDPROC         ;
197
198  ;----------------------------------------------------------------
199  ;                    INITIALIZATION ROUTINES
200  ;----------------------------------------------------------------
```

```
201
202            DEFSEG   INITIALIZE,CLASS=CODE
203            SEG      INITIALIZE
204
205            ; Initialize Internal System Controls
206
207   POR:     MOV      IE,#00           ; Disable All Interrupts
208            MOV      TCON,#00         ; Make Shure All Timers Are Off
209            MOV      SP,#$2F          ; Start Stack at $30 - 16 Bytes of Stack Space
210
211            ; Initialize I/O Pins
212
213            SETB     EOC              ; Configure as Input Port
214            SETB     RAMPUP           ; Discharge Integration Capacitor
215            CLR      RAMPDN           ; Discharge Integration Capacitor
216
217            .; Initialize Flags
218
219            CLR      OVRFLG           ; No Overflow
220            CLR      NEGFLG           ; Assume Positive Pressure ...
221            CLR      GOFLG            ; Not Ready To Update Until A/D Runs Cycle
222            CLR      TOROLL           ; No Timer Rollover
223            CLR      ROLFLG           ; Same Here
224
225            ; Initialize Variables
226
227            CLR      RS0              ; Select Bank 1
228            CLR      RS1              ;
229
230            CLR      A                ; Null Accumulator
231
232            MOV      PTRL,#LOW(IDL)   ; Point Timer 0 Interrupt To Idle Phase
233            MOV      PTRH,#HIGH(IDL);
234
235            MOV      PSIHEX,A         ; Zero Any Existing Calculated Depth
236            MOV      PSIDEC,A         ;
237            MOV      PEAKHEX,A        ; Zero Any Existing Peak Depth
238            MOV      PEAKDEC,A        ;
239            MOV      HOLDCNT,A        ;
240
241            MOV      CORRL,A          ; Zero Out Data Registers              Lo
242            MOV      CORRH,A          ;                                      Hi
243            MOV      RAWL,A           ; Zero Out A/D Reading Registers       Lo
244            MOV      RAWH,A           ;                                      Hi
245
246            ; Initialize Timer
247
248            MOV      RTL,A            ; Do First Integration For 65536 Counts
249            MOV      RTH,A            ;
250
251            MOV      R0,#PSIHEX       ; Show Zero's On LED
```

```
252         CLR     LZB             ;
253         ACALL   DATAOUT         ;
254
255         ; Initialize Interrupts
256
257         SETB    TR              ; Start Timer #0 (Integration Counter)
258         SETB    IT0             ; Ext IRQ #0 Negative Edge Triggered (E.O.C.)
259         SETB    ET0             ; Enable Timer #0 IRQ's
260         SETB    EX0             ; Enable EOC IRQ's
261         SETB    EA              ; Enable All Selected Interrupts
262
263         ACALL   DOCAL           ;
264         ACALL   BLNKOUT         ;
265         AJMP    MAIN            ;
266
267 ;----------------------------------------------------------------
268 ;                       LED ROUTINES
269 ;----------------------------------------------------------------
270
271         DEFSEG  LED,CLASS=CODE
272         SEG     LED             ;
273

274 DATAOUT:        PROC
275         MOV     A,@R0           ;
276         SWAP    A               ;
277         ANL     A,#$0F          ;
278         JNZ     NOLZB           ;
279         JNB     LZB,NOLZB       ;
280         MOV     A,#$0B          ;
281 NOLZB:  MOV     B,A             ;
282         MOV     A,LEDPORT       ;
283         ANL     A,#$F0          ;
284         ORL     A,B             ;
285         MOV     LEDPORT,A       ;
286         CLR     DIGIT10         ;
287         SETB    DIGIT10         ;
288
289         MOV     A,@R0           ;
290         ANL     A,#$0F          ;
291         MOV     B,A             ;
292         MOV     A,LEDPORT       ;
293         ANL     A,#$F0          ;
294         ORL     A,B             ;
295         MOV     LEDPORT,A       ;
296         CLR     DIGIT1          ;
297         SETB    DIGIT1          ;
298         RET                     ;
299
300 DATAOUT:        ENDPROC
```

```
301
302   ;----------------------------------------------------------------
303
304   BLNKOUT:        PROC            ;
305
306           MOV     A,LEDPORT       ;
307           ANL     A,#$F0          ;
308           ORL     A,#$0B          ;
309           MOV     LEDPORT,A       ;
310           CLR     DIGIT1          ;
311           SETB    DIGIT1          ;
312           CLR     DIGIT10         ;
313           SETB    DIGIT10         ;
314           RET                     ;
315
316   BLNKOUT:        ENDPROC         ;
317
318   ;----------------------------------------------------------------
319   ;       .            MATH    ROUTINES
320   ;----------------------------------------------------------------
321
322           DEFSEG  MATH,CLASS=CODE
323           SEG     MATH            ;
324
325   A2DCALC:        PROC            ;
326
327           MOV     A,RAWL          ; Get Raw Count LSB to .A
328           MOV     B,RAWH          ; Get Raw Count MSB to .B
329
330           CLR     C               ;
331           SUBB    A,OFFSETL       ; Subtract Offset (Low)
332           MOV     CORRL,A         ; Save Corrected A/D Data (Low)
333           XCH     A,B             ;
334           SUBB    A,OFFSETH       ; Subtract Offset (High)
335           MOV     CORRH,A         ; Save Corrected A/D Data (High)
336
337   ;                                 If ROLFLG    Then STATUS
338   ; If Raw > Offset Then Carry =  0,       0           OK
339   ; If Raw > Offset Then Carry =  0,       1           Overflow
340   ; If Raw < Offset Then Carry =  1,       0           Underflow
341   ; If Raw < Offset Then Carry =  1,       1           OK
342
343           CLR     NEGFLG          ; Reset Flags
344           CLR     OVRFLG          ;
345
346           JNC     CHKOVR          ;
347   CHKNEG: ANL     C,/ROLFLG       ;
348           MOV     NEGFLG,C        ; Save Negative Pressure Flag
349           RET                     ;
350
351   CHKOVR: ORL     C,ROLFLG        ;
```

```
352            MOV      OVRFLG,C         ; Save Overflow Flag
353            RET                       ;
354
355  A2DCALC:           ENDPROC          ;
356
357  ;------------------------------------------------------------------
358
359  HEX2BCD:           PROC             ; 0..99 BCD Conversion
360
361            MOV      A,@R0            ; R0 = Pointer to Source    (Hex) Byte
362            MOV      @R1,#$00         ; R1 = Pointer to Destination (BCD) Byte
363
364            CLR      C                ;
365  L71:      SUBB     A,#10            ; Subtract 10 From Hex Number
366            INC      @R1              ; Count # of 10's Subtracted
367            JNC      L71              ; Keep Subtracting Until Borrow
368            DEC      @R1              ; Too Many 10's ... Decrement Count
369            ADD      A,#10            ; Give Back The 10 That Caused Borrow
370            SWAP     A                ; Put 1's That Are Left In 10's Place
371            XCHD     A,@R1            ; Get 10's Digit To Lower Nibble
372            SWAP     A                ; Straighten Everything Out
373            MOV      @R1,A            ; Save BCD Number
374            RET                       ;
375
376  HEX2BCD:           ENDPROC          ;
377
378  ;------------------------------------------------------------------
379
380  PSICALC:           PROC             ;
381
382            JB       OVRFLG,OVRFLW    ;
383            JB       NEGFLG,UNDFLW    ;
384
385            MOV      A,CORRH          ; Look At Only The Top 6 Bits Of the
386            RR       A                ; 16 Bit A/D Value,  Depth = 0..63
387            RR       A                ;
388            ANL      A,#$3F           ;
389            MOV      PSIHEX,A         ;
390            SJMP     DOPSI            ;
391  OVRFLW: MOV        PSIHEX,#$40      ; Put In 64 if Overflow
392            SJMP     DOPSI            ;
393  UNDFLW: MOV        PSIHEX,#$00      ; Put In 00 if Underflow
394
395  DOPSI:    MOV      R0,#PSIHEX       ; Convert To BCD Number
396            MOV      R1,#PSIDEC       ;
397            ACALL    HEX2BCD          ;
398
399            CLR      C                ; Compare Present Reading To Peak Reading
400            MOV      A,PEAKHEX        ;
401            SUBB     A,PSIHEX         ;
402            JC       DOPEAK           ; Save & Calculate BCD if New Peak
```

```
403             RET                             ; Return If Not
404
405    DOPEAK:  MOV     PEAKHEX,PSIHEX   ;
406             MOV     R0,#PEAKHEX      ;
407             MOV     R1,#PEAKDEC      ;
408             AJMP    HEX2BCD          ;
409
410    PSICALC:         ENDPROC          ;
411
412    ;--------------------------------------------------------------------
413    ;                    ***** MAIN PROGRAM *****
414    ;--------------------------------------------------------------------
415
416             DEFSEG  MAINCODE,CLASS=CODE
417             SEG     MAINCODE
418
419    MAIN:    ORL     PCON,#01         ;
420
421             MOV     C,LZB            ;
422             ANL     C,TEST           ;
423             MOV     LZB,C            ;
424             JNB     SWITCH,SHOWPK    ;
425             JNB     TEST,SHOWPSI     ;
426             ACALL   BLNKOUT          ;
427             AJMP    CHKGO            ;
428
429    SHOWPSI: MOV     R0,#PSIDEC       ;
430             ACALL   DATAOUT          ;
431             MOV     HOLDCNT,#$00     ;
432             AJMP    CHKGO            ;
433
434    SHOWPK:  MOV     R0,#PEAKDEC      ;
435             ACALL   DATAOUT          ;
436
437             CLR     C                ;
438             INC     HOLDCNT          ;
439             MOV     A,HOLDCNT        ;
440             SUBB    A,#HOLDCYC       ;
441             JC      CHKGO            ;
442             AJMP    POR              ;
443
444    CHKGO:   JNB     GOFLG,MAIN       ;
445             CLR     GOFLG            ;
446
447             ACALL   A2DCALC          ;
448             ACALL   PSICALC          ;
449
450             AJMP    MAIN             ;
451
452    ;--------------------------------------------------------------------
453    ;********************************************************************
```

```
454    ;-----------------------------------------------------------------
455
456           END                    ; END OF ASSEMBLY
No lines contained errors.
No lines contained warnings.
```

While certain features and embodiments of the invention have been described in detail herein, it will be readily understood that the invention encompasses all modifications and enhancements within the scope and spirit of the following claims.

I claim:

1. An on line, controllable electronic fishing depth indicator for monitoring the water depth of a trollable fishing bait of the type trollable from a rod and reel located within a boat when both the depth indicator and the bait are secured to and trolled by a fishing line, the fishing depth indicator comprising:
   a. an elongate, hydrodynamic body having an outer peripheral wall, opposite closed ends and a hollow interior cavity;
   b. through ports in the body and in communication with the cavity;
   c. means for securing one end of the body to a fishing line in combination with a fishing bait for trolling the body beneath the water in the same conditions as the fishing bait;
   d. a pressure sensor, said pressure sensor including a pressure transducer mounted in the cavity and in communication with the ports, and adapted for sensing the water pressure in the ports and producing in response a transducer signal indicating the water depth of the transducer;
   e. a control circuit associated with the pressure transducer for receiving the transducer signal and producing in response thereto an output signal relating to the water depth of the transducer;
   f. a readout device associated with the control circuitry and adapted for converting the output signal into a useable form; and
   g. a power supply associated with the pressure transducer, the control circuitry and the readout device for driving same, said power supply including a control element for controlling the power supply and the readout device, said control element adapted to sequence through a plurality of operative modes.

2. The fishing depth indicator of claim 1, wherein the pressure transducer, control circuit, readout device and power supply are housed within the cavity.

3. The fishing depth indicator of claim 1, wherein there is further included means for selectively generating the useable output signal in English and metric distances.

4. The fishing depth indicator of claim 1, wherein said readout device comprises an LCD module.

5. The fishing depth indicator of claim 1, wherein said body is made of a transparent material and wherein said pressure sensor includes a readout device adapted for producing a visual output signal readable through said body.

6. The fishing depth indicator of claim 1, wherein said body is an elongate cylinder having opposite ends terminating in a rounded, conical tip, said body and ends having a generally torpedo shape.

7. The fishing depth indicator of claim 6, wherein each of said conical tip ends includes an elongate cylindrical portion extending outwardly from said tip, each of said portions having an outer diameter less than the outer diameter of the elongate cylinder and being disposed in axial alignment with the elongate cylinder.

8. The fishing depth indicator of claim 6, further including a fastener secured to the conical tip of one end of the cylinder and adapted for securing the fishing depth indicator to the fishing line.

9. The fishing depth indicator of claim 8, wherein the fishing bait is secured to the fishing line and the fishing depth indicator is secured to the fishing line in series with the fishing bait.

10. The fishing depth indicator of claim 9, wherein the fishing bait trails the fishing depth indicator.

11. The fishing depth indicator of claim 9, wherein the fishing depth indicator trails the fishing bait.

12. The fishing depth indicator of claim 8, wherein the fishing bait is secured to the fishing line and the fishing depth indicator is secured to the fishing line in parallel with the fishing bait.

13. The fishing depth indicator of claim 8, further including a second fastener secured to the conical tip of the other end of the body, whereby said one end of the fishing depth indicator may be secured to the fishing line and said other end of the fishing depth indicator may be secured to the fishing bait.

14. The fishing depth indicator of claim 1, wherein one of said ends is releasably secured to said body for selectively gaining access to the body cavity.

15. The fishing depth indicator of claim 14, wherein said body includes a female threaded portion adjacent the releasable end and said releasable end includes a male threaded portion adapted to be threadably received in said female threaded portion.

16. The fishing depth indicator of claim 5, wherein each of said threaded portions terminates in an annular shoulder and wherein there is further included a sealing ring mounted on the threaded portion of said removable end and adapted for engaging the annular shoulders for sealing the cavity.

17. The fishing depth indicator of claim 13, wherein said releasable end includes a chamber in communication with and forming a part of said cavity and wherein said ports are disposed in said releasable end and are in communication with said chamber.

18. The fishing depth indicator of claim 17, wherein the pressure sensor includes a pressure transducer mounted in said chamber in communication with said ports and adapted for monitoring the water pressure in said ports and a control circuit and power supply adapted for controlling and driving the pressure transducer mounted in the body portion of said cavity.

19. The fishing depth indicator of claim 18, wherein there is further included sealing means in said chamber for sealing the body portion of the cavity from said chamber.

20. The fishing depth indicator of claim 18, wherein there is further included a readout device in said chamber and in communication with said control circuit for providing a visual readout corresponding to the water pressure monitored by said pressure transducer.

21. The fishing depth indicator of claim 20, wherein said body is constructed of a transparent material and said readout device is visible therethrough.

22. The fishing depth indicator of claim 1, wherein said control circuit further comprises:
   a. means for calibrating the transducer signal to produce an output signal corresponding to the water depth of the fishing bait; and
   b. means for producing a calibrated output signal.

23. The fishing depth indicator of claim 22, wherein said means for calibrating the transducer signal is a programmable signal processor.

24. The fishing depth indicator of claim 22, wherein said means for producing a calibrated output signal is adapted for selectively producing a signal in English and metric distances.

25. An on line, trollable electronic fishing depth indicator for monitoring the water depth of a trollable fishing bait of the type trollable from a rod and reel located within a boat when both the depth indicator and the bait are secured to and trolled by a fishing line, the fishing depth indicator comprising:
   a. an elongate, hydrodynamic body having an outer peripheral wall, opposite closed ends and a hollow interior cavity;
   b. through ports in the body and in communication with the cavity;
   c. means for securing one end of the body to a fishing line in combination with a fishing bait for trolling the body beneath the water while attached thereto;
   d. a pressure sensor including:
      a pressure transducer in the cavity and in communication with the ports, and adapted for sensing the water pressure in the ports and for producing a transducer signal in response thereto;
      a control circuit associated with the pressure transducer for receiving the transducer signal and producing in response thereto an output signal relating to the water depth of the transducer;
      a readout device associated with the control circuitry and adapted for converting the output signal into a useable form; and
   e. a power supply associated with the pressure transducer, the control circuitry and the readout device for driving same, said power supply including a switch for controlling the power supply and the readout device, said switch adapted to sequence through a plurality of operative modes.

26. The fishing depth indicator of claim 25, wherein said
   a. programmable means for calibrating the transducer signal to produce and output signal corresponding to the water depth of the fishing bait; and
   b. means for producing a calibrated output signal.

27. The fishing depth indicator of claim 25, wherein said control circuit, said readout device and said power supply are housed in said cavity.

28. The fishing depth indicator of claim 27, wherein said body is constructed of a transparent material and said readout device is adapted for producing a visual signal readable therethrough.

29. An on line, trollable electronic fishing depth indicator for monitoring the water depth of a trollable fishing bait of the type trollable from a rod and reel located within a boat when both the depth indicator and the bait are secured to and trolled by a fishing line, the fishing depth indicator comprising:
   a. an elongate, hydrodynamic body comprising an elongate cylinder having opposite closed ends, each terminating in a rounded, conical tip, said body and ends having a generally torpedo shape, the body having a hollow interior cavity;
   b. through ports in the body and in communication with the cavity;
   c. means for securing one end of the body to a fishing line in combination with a fishing bait for trolling the body beneath the water while attached thereto; and
   d. a pressure sensor, said pressure sensor including a pressure transducer mounted in the cavity and in communication with the ports for reading the water pressure in the ports and producing in response thereto a useable output indicating the water depth of the transducer; and
   e. a control circuit and power supply mounted in the body portion of said cavity and adapted for controlling and driving the pressure transducer, said power supply including a means for controlling the power supply.

30. The fishing depth indicator of claim 29 further including a fastener secured to the conical tip of one end of the body and adapted for securing the fishing depth indicator to a fishing line.

31. The fishing depth indicator of claim 30, wherein the fishing bait is secured to the fishing line and the fishing depth indicator is secured to the fishing line in series with the fishing bait.

32. The fishing depth indicator of claim 31, wherein the fishing bait trails the fishing depth indicator.

33. The fishing depth indicator of claim 31, wherein the fishing depth indicator trails the fishing bait.

34. The fishing depth indicator of claim 29, wherein the fishing bait is secured to the fishing line and the fishing depth indicator is secured to the fishing line in parallel with the fishing bait.

35. The fishing depth indicator of claim 29, wherein one of said ends is releasably secured to said body for selectively gaining access to the body cavity, the body including a female threaded portion adjacent the releasable end and said releasable end including a male threaded portion adapted to the threadably received in said female threaded portion.

36. The fishing depth indicator of claim 35, wherein each of said threaded portions terminates in an annular shoulder and wherein there is further included a sealing ring mounted on the threaded portion of said removable end and adapted for engaging the annular shoulders for sealing the cavity.

37. The fishing depth indicator of claim 5, wherein said releasable end includes a chamber in communication with and forming a part of said cavity and said ports are disposed in said releasable ends and are in communication with said chamber, and wherein the pressure transducer is mounted in said chamber in communication with said ports and adapted for monitoring the water pressure in said ports.

38. The fishing depth indicator of claim 37, wherein there is further included sealing means in said chamber for sealing the body portion of the cavity from said chamber.

39. The fishing depth indicator of claim 38, wherein there is further included a readout device in said cavity and in communication with said control circuit for providing a visual readout of corresponding to the water pressure monitored by said pressure transducer.

40. The fishing depth indicator of claim 39, wherein said body is constructed of a transparent material and said readout device is visible therethrough.

* * * * *

UNITED STATES PATENT AND TRADEMARK OFFICE
CERTIFICATE OF CORRECTION

PATENT NO. : 5,351,538

DATED : October 4, 1994

INVENTOR(S) : MICHAEL P. MCGUIRE ET AL

It is certified that error appears in the above-identified patent and that said Letters Patent is hereby corrected as shown below:

CLAIM 1            Delete "controllable" and substitute -- trollable --
COLUMN 31, LINE 15

CLAIM 26           After "said" add -- control circuit further
COLUMN 33, LINE 51    comprises: --

Signed and Sealed this

Twenty-fourth Day of January, 1995

Attest:

BRUCE LEHMAN

Attesting Officer           Commissioner of Patents and Trademarks